Patented June 1, 1943

2,320,675

UNITED STATES PATENT OFFICE 2,320,675

ELECTRIC ARC WELDING OF MANGANESE BRONZE

Clinton E. Swift, Hales Corners, Wis., assignor to Ampco Metal, Inc., Milwaukee, Wis., a corporation of Wisconsin No Drawing. Application July 4, 1942, Serial No. 449,805

8 Claims. (Cl. 219—10)

This invention relates to electric arc welding manganese bronze and the like.

The welding of manganese bronze by the electric arc welding process has heretofore been considered impractical, particularly where it was desired to obtain a weld deposit having physical properties comparable to those of the parts being welded. Manganese bronze, like brass, contains a large amount of zinc which, under the heat of a welding arc, tends to boil up and vaporize, resulting in porous weld deposits of poor physical properties.

The principal object of the invention is to overcome these difficulties and to produce a sound arc weld in manganese bronze or the like.

Another object is to provide an article primarily of copper-zinc alloy fabricated by arc welding and in which the weld deposit is dense and has its principal physical properties comparable to those of the welded stock.

The invention is primarily embodied in an article in which the weld deposit has a graduating composition from that of the stock adjacent the latter to one approaching that of the weld rod at the upper center portion of the weld, the weld rod employed being of an aluminum bronze composition substantially free of zinc. Where hardness or better grain refinement is desired with reasonable ductility a small amount of iron is employed in the weld rod. The weld rod should be covered to prevent the formation of aulminum oxide film generally objectionable in aluminum bronze welding, and to stabilize the arc.

A specific embodiment of the invention lies in a welded article of medium to low manganese bronze of about the following stock composition:

| | Percent |
|---|---|
| Copper | 60 |
| Zinc | 38 |
| Aluminum | 1 |
| Iron | 0.5 |
| Manganese | 0.5 | and in which the weld deposit varies from the above stock composition to a composition at the upper central portion of the weld approaching that of the weld rod employed, which is preferably as follows:

| | Percent |
|---|---|
| Copper | 89.6 |
| Aluminum | 9.0 |
| Iron | 1.0 |
| Impurities | 0.4 |

The stock or base material of the article above described will have a minimum tensile strength of about 65,000 pounds per square inch and a hardness of about 120 Brinell (3,000 kg. load). The weld described will have physical properties very close to those of the stock.

The weld rod employed having the above core wire composition should have a covering generally similar to that set forth in the United States Patent No. 2,238,392 granted to Milan A. Matush on April 15, 1941. The preferred composition for the covering, however, is in accordance with an improvement set forth in applicant's copending application Serial No. 459,843, filed September 26, 1942.

Specifically, the covering is preferably composed of the following ingredients:

| | Parts by weight |
|---|---|
| Sodium fluoride | 40 |
| Cryolite | 40 |
| Carbon | 20 | with sodium silicate added as a binder. The covering serves to facilitate the maintaining of the welding arc and greatly improves the efficiency of deposit and the soundness of the weld.

The composition of the core wire may be similar to that set forth in the Matush patent above referred to, but preferably the iron content is reduced to less than one percent. It has been found that iron has a tendency to combine with the zinc and result in a weld metal low in ductility. The aluminum content of the electrode should not be less than about 7½% for welding manganese bronzes and not less than about 5% for welding rolled brass. The weld rod should not contain appreciable quantities of zinc or any similar ingredient, and where hardness is not required it need not contain iron.

In carrying out the welding operation it has been found preferable to preheat the parts being welded to from 300° to 600° F. and to employ a very low current density in the electrode. With an electrode of about ⅜ inch diameter, of the composition above described, and the parts preheated, good welds can be obtained with a current of from 350 to 225 amperes and an arc voltage between 30 and 40 volts. By keeping the current density low in this manner, with the parts preheated, it is possible to avoid excessive vaporization of the zinc of the parts and to obtain a good fusion between the metal being deposited and the parts. The weld produced is dense and free from any large blowholes and will have good physical properties.

Where the invention is applied to higher strength manganese bronzes a higher strength aluminum bronze weld rod should be employed. Where the aluminum in the core wire is raised to above 11% it is possible to increase the iron content to about 5% to increase the hardness and grain refinement. The latter composition gives a weld deposit of about 230 Brinell hardness, which is comparable to the hardness of a high strength manganese bronze having substantially the following composition:

| | |
|---|---:|
| Copper | 61.5 |
| Zinc | 27.0 |
| Aluminum | 5.5 |
| Iron | 2.5 |
| Manganese | 3.5 |

The invention may be applied in the fabrication of articles from rolled brass, including Muntz metal, as well as manganese bronze. It makes possible for the first time the production of arc welds in brass and manganese bronze having certain comparable physical properties. In addition the welds of the present invention are dense and have good electrolytic corrosion resistance for most uses.

The term "weld," as employed herein, is meant to include overlays and surface deposits as well as weld deposits in grooves and the like.

Various embodiments of the invention may be employed within the scope of the claims.

The invention is claimed as follows:

1. A welded article having a base alloy composition predominantly of copper with a substantial amount of zinc, and in which the weld has a composition predominantly of copper with an aluminum constituent and is substantially free of zinc except at the fusion zone with the base stock, the weld being dense, free from large blowholes and having physical properties comparable to those of the base stock.

2. An arc welded article of manganese bronze having a base alloy composition predominantly of copper with a large amount of zinc and small percentage of manganese, and in which the weld is composed of a deposit of aluminum bronze substantially free of zinc and fused with the base alloy, the weld being dense and having physical properties comparable to those of the base alloy.

3. An arc welded article of manganese bronze having a base alloy composition predominantly of copper with a substantial amount of zinc and small percentages of hardening ingredients, and in which the weld is composed of a deposit of aluminum bronze substantially free of zinc and fused with the base alloy, the weld being dense and having a composition varying from that of the base in the region of fusion therewith to that obtainable from a covered aluminum bronze weld rod having an aluminum content in excess of about 5%, and an iron content not greater than about 5%.

4. The process of welding an article having a base alloy composition predominantly of copper with a substantial amount of zinc, comprising depositing thereon an aluminum bronze and fusing the same therewith by heat.

5. The process of electric arc welding stock of copper-zinc alloys, comprising establishing a welding arc with the work as one electrode, progressively supplying to said arc aluminum bronze weld metal, and fusing the aluminum bronze with the metal of the work to provide a dense weld.

6. The process of electric arc welding stock of copper-zinc alloy, comprising establishing a welding arc between the work and an aluminum bronze welding electrode, and progressively depositing and fusing the aluminum bronze with the metal of the work to provide a weld of physical properties comparable to those of the stock being welded.

7. The process of electric arc welding stock of manganese bronze having small aomunts of one or more of the following ingredients: manganese, aluminum, silicon, tin, nickel and iron therein, comprising establishing a welding arc between the work and an aluminum bronze welding electrode having an aluminum content in excess of about 7½% and an iron content not greater than about 5%, and progressively depositing and fusing the aluminum bronze with the stock.

8. The process of electric arc welding brass, comprising establishing a welding arc between the brass stock to be welded and an aluminum bronze welding electrode containing at least 5% of aluminum and substantially free of zinc, and progressively depositing the aluminum bronze upon the stock and fusing the same together by the heat of the arc.

CLINTON E. SWIFT.